United States Patent [19]
Utaka et al.

[11] Patent Number: 6,084,997
[45] Date of Patent: Jul. 4, 2000

[54] COUPLED WAVEGUIDE STRUCTURE

[75] Inventors: Katsuyuki Utaka, Kiyose; Shinsuke Tanaka, Tokyo; Masayoshi Horita, Tokyo; Yuichi Matsushima, Tokyo, all of Japan

[73] Assignee: Kokusai Denshin Denwa Kabushiki Kaisha, Tokyo, Japan

[21] Appl. No.: 09/102,714

[22] Filed: Jun. 22, 1998

[30] Foreign Application Priority Data

Jun. 20, 1997 [JP] Japan ................................ 9-163675

[51] Int. Cl.$^7$ ................................................. G02B 6/34
[52] U.S. Cl. ................................ 385/37; 385/42; 385/50
[58] Field of Search ................................ 385/15, 27, 28, 385/37, 42, 50, 129, 130, 132

[56] References Cited

U.S. PATENT DOCUMENTS

| | | | |
|---|---|---|---|
| 4,146,297 | 3/1979 | Alferness et al. | 350/96.14 |
| 5,504,772 | 4/1996 | Deacon et al. | 372/102 |

FOREIGN PATENT DOCUMENTS

| | | |
|---|---|---|
| 01096605 | 4/1989 | Japan . |
| 8184789 | 7/1996 | Japan . |

OTHER PUBLICATIONS

T. Wongcharoen et al., "Accurate Characterization of Optical Filters with Two–Dimensional Confinement", Journal of Lightwave Technology, vol. 14, No. 11, (1996), pp. 2596–2603.

H. Venghaus et al., "Polarization Independent Mach–Zehnder Interferometer on III–V–Semiconductors", Proceedings of the European Conference on Optical Communication (EC, Montreux (1993) Regular Papers, vol. 2, No. 19, pp. 253–256.

J.D. Love et al., "Highly Broadband Buried Channel Couplers", Electronics Letters, vol. 30, No. 22, (1994), pp. 1853–1855.

A. Takagi, et al., "Design and Fabrication of Broad–Band Silica–Based Optical Waveguide Couplers with Asymmetric Structure", IEEE Journal of Quantum Electronics, vol. 28, No. 4, (1992), pp. 848–855.

G.H.B. Thompson, "Analysis of Optical Directional Couplers That Include Gain or Loss and Their Application to Semiconductor Slab Dielectric Guides", Journal of Lightwave Technology, vol. 4, No. 11 (1986), pp. 1678–1693.

*Primary Examiner*—John D. Lee
*Assistant Examiner*—Michelle R. Connelly-Cushwa
*Attorney, Agent, or Firm*—Christie, Parker & Hale, LLP

[57] ABSTRACT

The coupled waveguide structure comprises first and second rectangular waveguides, disposed closely. The aspect ratio of the first waveguide is substantially inverse in number to that of the second waveguide.

6 Claims, 5 Drawing Sheets

COUPLED WAVEGUIDE STRUCTURE

FIELD OF THE INVENTION

This invention relates to a coupled waveguide structure with no or less polarization dependency.

BACKGROUND OF THE INVENTION

A coupled waveguide represented by a directional coupler is an important element which realizes various waveguide type optical devices such as not only an adder/divider, optical modulator and optical switch but also, combining with a diffraction grating, wavelength selecting optical add/dropping multiplexer (optical ADM element), either of the common directional coupler type or of the different directional coupler type, corresponding to the cycle of the diffraction grating. Known as practically indispensable three-dimensional waveguide structures are ridge type structures and buried type structures. In both structures, two waveguides having substantially the same aspect ratio, namely, the ratio between equivalent horizontal and vertical waveguide widths relative to the substrate, are symmetrically disposed close to each other.

For example, for simplicity of fabrication, each of two waveguides in a conventional structure has a transversely flat configuration with a horizontal effective waveguide width of 1 to 3 $\mu$m and a vertical effective waveguide width of approximately 0.5 $\mu$m. If the vertical effective waveguide width relative to the horizontal effective waveguide width with respect to the substrate is defined as the aspect ratio, then the aspect ratio is 1 or less.

As an example having an asymmetric waveguide structure, a polarization-independent wavelength filter capable of stably selecting a specific wavelength from input light having an arbitrary polarized state is disclosed in Japanese Patent Laid-open Publication 8-184789. In this wavelength filter, two waveguides 11, 12 are disposed closely, a common-directional coupler grating 13 is formed in the input-side polarization separation region, and a wavelength selection region having a DBR- or DFB-structured grating 14 is formed next to the grating 13. In the polarization separation region, widths and thicknesses of the waveguide 11, 12 are determined so that the TE mode propagation constant of the waveguide 11 (wavelength $\lambda 1$) coincides to the TE mode propagation constant of the waveguide 12 (wavelength $\lambda 1$). In the polarization selection region, widths and thicknesses of the waveguides 11, 12 are determined so that the TM mode propagation constant of wavelength $\lambda 1$ of the waveguide 11 coincides to the TE mode propagation constant of wavelength $\lambda 1$ of the waveguide 12.

In this structure, TE mode components of wavelength $\lambda 1$ move to the waveguide 12 and TM mode components travel along the waveguide 11 in the polarization separation region. In the wavelength selection region, optical signals with wavelength $\lambda 1$ travelling along the waveguides 11, 12 are selectively amplified. Since the TM mode propagation constant of wavelength of the waveguide 11 is made to coincide with the TE mode propagation constant of wavelength $\lambda 1$ of the waveguide 12 in the wavelength selection region, no time difference occurs between waves with wavelength $\lambda 1$ travelling in both waveguides 11 and 12. By multiplexing outputs from the waveguides 11, 12 in their polarized states, wavelength $\lambda 1$ can be extracted from input light without dependence on polarization.

In the conventional symmetric coupled waveguide structure, however, the TE mode propagation constant is larger than the TM mode propagation constant in both waveguides. This causes a difference in the coupling length for the TE—TE mode coupling and TM—TM mode coupling between both waveguides, as well as a difference in coupling characteristics, such as half wavelength voltage in case of an optical switch, and a difference in optical filter characteristics, such as center wavelength in case of a diffraction grating loaded structure. That is, the conventional waveguide structure depends on polarization.

Due to the polarization dependency, the conventional coupled waveguide structure is subject to output fluctuation when the polarization of input light varies randomly, for example, in optical fiber communication and this is a practically serious problem.

Moreover, the prior art disclosed in the above-identified publication needs gratings 13, 14 having desired grating constants, respectively, in the polarization separation region and the wavelength selection region. Additionally, the structure must be designed and formed so as to ensure TE—TE mode coupling (or TM—TM mode coupling) between waveguides 11, 12 in the polarization separation region while prohibiting TE—TE mode coupling (or TM—TM mode coupling) in the waveguides 11, 12 in the wavelength selection region, and selection of waveguide parameters is not easy.

SUMMARY OF THE INVENTION

It is therefore an object of the invention to provide a coupled waveguide structure having no polarization dependency and more easily manufactured.

Another object of the invention is to provide a coupled waveguide structure having a simple structure and capable of adding/dropping a specific wavelength with no polarization dependency.

According to the invention, a first waveguide and a second waveguide having aspect ratios related as substantially inverse numbers are disposed closely. Alternatively, waveguide parameters are determined to substantially equalize the sum of the TE mode propagation constant of the first waveguide and that of the second waveguide to the sum of the TM mode propagation constant of the first waveguide and that of the second waveguide.

As a result, the magnitude relation between the TE mode propagation constant and the TM mode propagation constant is opposite between the first waveguide and the second waveguide, and this makes it easier to equalize the coupling conditions for the TE mode coupling and the TM mode coupling. Therefore, polarization dependency can be removed or alleviated.

When a diffraction grating for compensating the difference between TE mode propagation constants and the difference between TM mode propagation constants of the first and second waveguides, or a diffraction grating having the wave number substantially equal to one of the sum of the TE mode propagation constants and the sum of the TM mode propagation constants of the first and second waveguides, is provided for common use in the first and second waveguides, an optical filter for extracting or eliminating a specific wavelength can be realized.

Also a device for adding/dropping a specific wavelength can be realized. In any element, polarization dependency can be removed, or minimized, if any.

DESCRIPTION OF THE PREFERRED EMBODIMENTS

Explained below are some embodiments of the invention with reference to the drawings.

Figure 1:
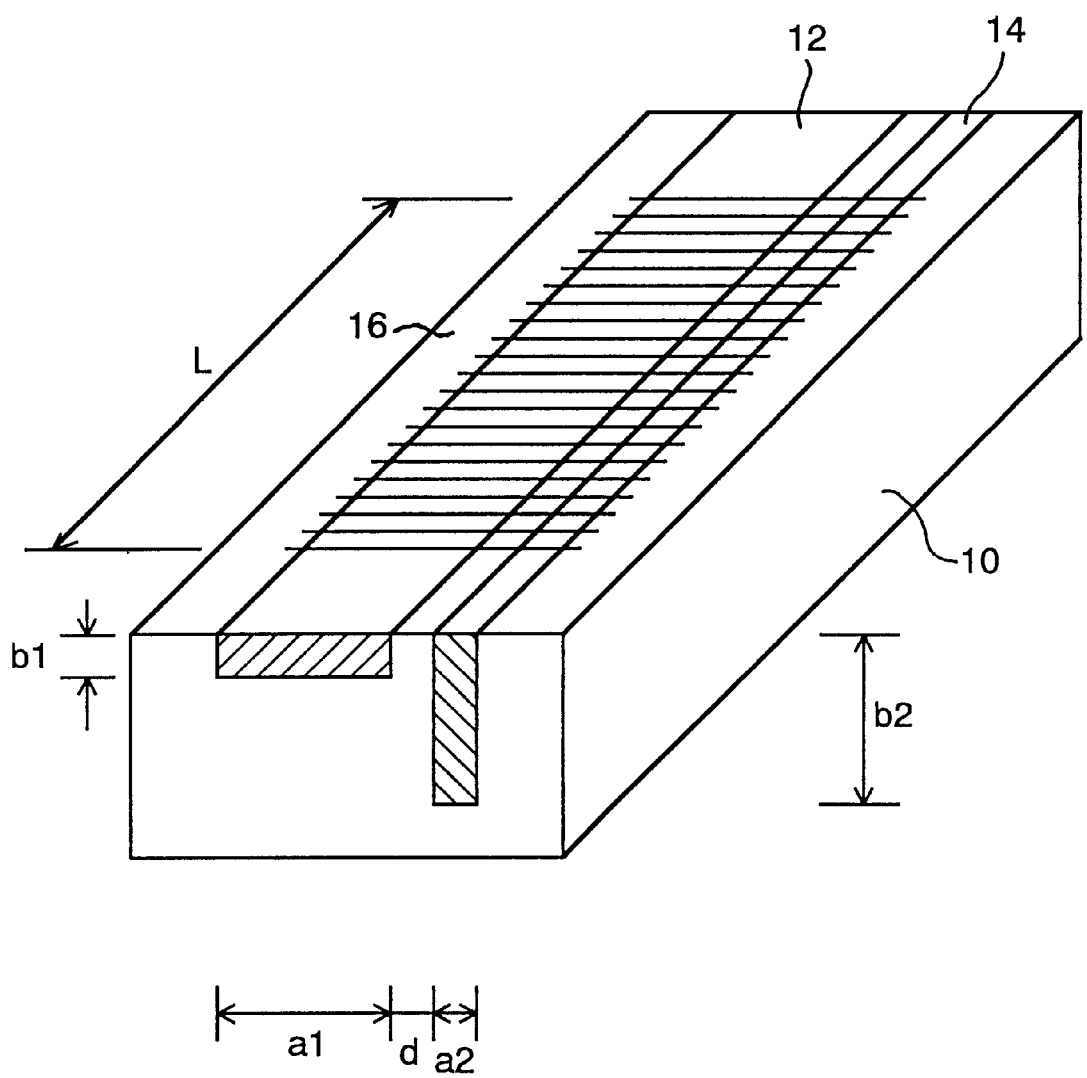
FIG. 1 is a perspective view of an embodiment according to the invention.

FIG. 1 is a perspective view of an add/drop device embodying the invention. Two InGaAsP rectangular waveguides 12 and 14 distant by distance d are formed on an InP substrate 10. The distance d is close enough for leak components of light propagating through the waveguides 12, 14 to overlap with each other, namely, approximately 1 to some µm. In a specific example of sizes of the rectangular waveguides 12, 14, one is 2 µm wide and 0.5 µm thick, and the other is 0.5 µm wide and 2 µm thick. Three-dimensional waveguide structures are generally classified into three groups, namely, ridge-type structures made by removing the material down to a midway portion of the core layer, buried-type structures made by fully covering the core with a cladding layer, and load-type structures made by loading a material having a large refractive index above the waveguide to increase the effective refractive index of the core portion. The waveguides 12, 14 may have any of these structures, and these waveguides 12, 14 may be different in structure from each other.

A diffraction grating 16 of period Λ is formed to extend to bridge the waveguides 12, 14 over a necessary coupling distance L. The distance L is determined, for example, so that product thereof with the coupling coefficient of the diffraction grating be not less than π, and may be, for example, approximately 1 mm.

Assume that the number of waves of the diffraction grating 16 is K (=2 π/Λ), TE mode and TM mode propagation constants of the waveguide 12 are β1 (TE) and β1 (TM), and TE mode and TM mode propagation constants of the waveguide 14 are β2 (TE) and β2 (TM), in this embodiment, both TE mode and TM mode couple between waveguides 12, 14 under the same coupling conditions (coupling length and coupling efficiency) by determining the period Λ of the diffraction grating 16 satisfies the following phase matching conditions:

$$|\beta1(TE)+\beta2(TE)|=K \quad (1)$$

$$|\beta1(TM)+\beta2(TM)|=K \quad (2)$$

of course, the difference between propagation constants is preferably small from the viewpoint of the coupling efficiency.

Figure 2:
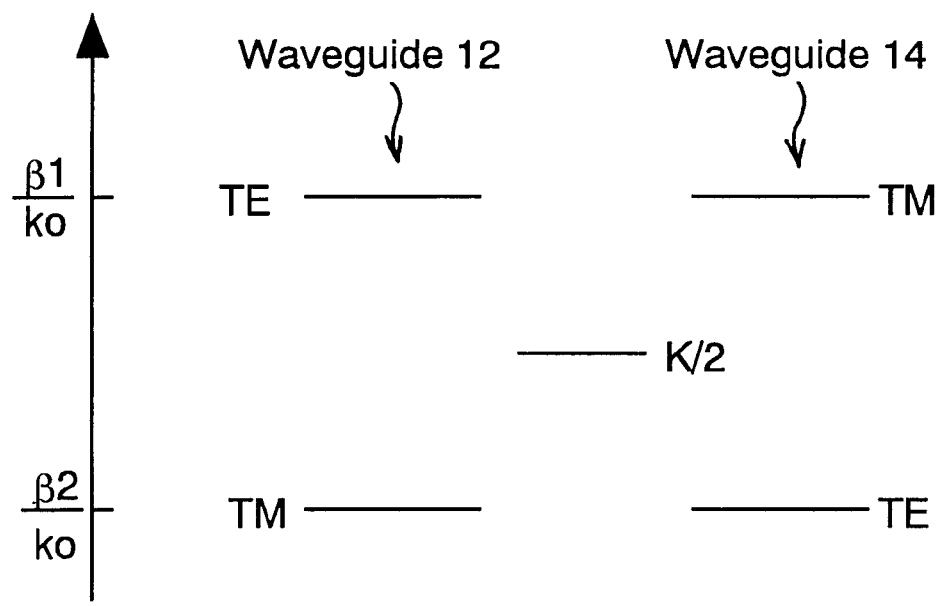
FIG. 2 is a diagram showing the relationship between polarization and the equivalent refractive indices of waveguides 12, 14.

FIG. 2 shows relations between the polarizations and the equivalent refractive indices of the waveguides 12, 14, which satisfy equations (1) and (2). The ordinate shows the equivalent refractive index neq, and the propagation constant β is generally expressed as 2 π neq/λ=ko·neq (where ko is the wave number in vacuum).

Assume that a1 is the width of the waveguide 12, b1 the thickness thereof, a2 the width of the waveguide 14 and b2 the thickness thereof, by ideally determining as $$a1=b2 \quad (3)$$

$$b1=a2 \quad (4)$$

the above-mentioned phase matching conditions are satisfied. In other words, by determining the aspect ratios of the waveguides 12, 14 to be relatively inverse numbers, the phase matching conditions can be satisfied.

Figure 3:
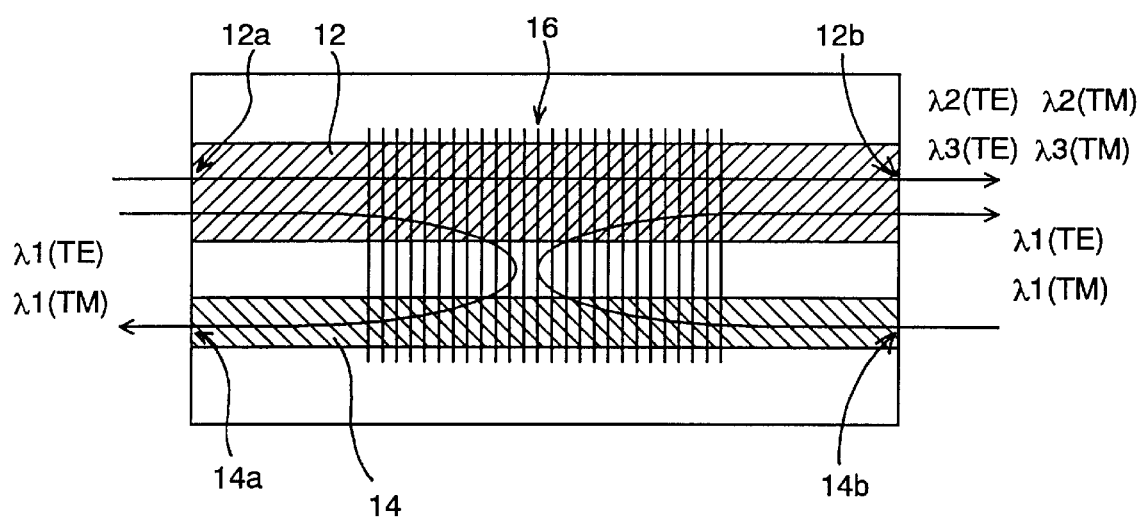
FIG. 3 is a plan view of embodiment for use in explanation of its behavior when used as an add/drop device.

FIG. 3 is a plan view of the embodiment. Assume here that the waveguides 12, 14 and the diffraction grating 16 be designed to satisfy the phase matching conditions for the wavelength λ1, signal light containing wavelengths λ1, λ2 and λ3 enter into one end 12a of the waveguide 12, and polarized states of wavelengths λ1 to λ3 be inconstant.

The signal light of wavelength λ1 is coupled from the waveguide 12 to the waveguide 14 with the same coupling conditions for both its TE mode component and TM mode component, and almost all thereof is reflected by the diffraction grating 16 during the coupling and output from one end 14a of the waveguide 14 on the same side as the input end 12a of the waveguide 12. Since the coupling condition is the same and also the reflective condition by the diffraction grating 16 is the same for both the TE mode and the TM mode, the input light of wavelength λ1 is maintained in the original state of polarization, and output from one end 14a of the waveguide 14. The other components of the signal light, namely, wavelengths λ2 and λ3, which are not coupled between the waveguides 12 and 14, propagate in the waveguide 12 while maintaining their polarization state, and are output from the other end 12b. That is, the device functions as a wavelength selecting filter for extracting a specific wavelength λ1 or a band eliminating optical filter for eliminating a specific wavelength.

The coupling efficiency between the waveguides 12 and 14 depends on the difference in propagation constant and, in general, the smaller the difference in propagation constant is, the more the power moves to the other waveguide. Therefore, the difference in propagation constant between two waveguides 12, 14 a becomes larger, the wavelength selecting function or the wavelength eliminating function decreases.

When the signal light of wavelength λ1 is input to the other end of 14b of the waveguide 14, the signal light is coupled to the waveguide 12 while it propagates in the waveguide 14 toward another end 14a, and is reflected by the diffraction grating 16. Since, here again, the coupling condition between the waveguides 12, 14 and the reflective condition of the diffraction grating 16 are the same for both the TE mode and the TM mode, the signal light of wavelength λ1 maintains the polarization state, and it outputs from the end 12b of the waveguide 12 on the same side as the input end 14b of the waveguide 14. That is, it results in adding the signal light of wavelength λ1 to the signal light of wavelengths λ2 and λ3.

Figure 4:
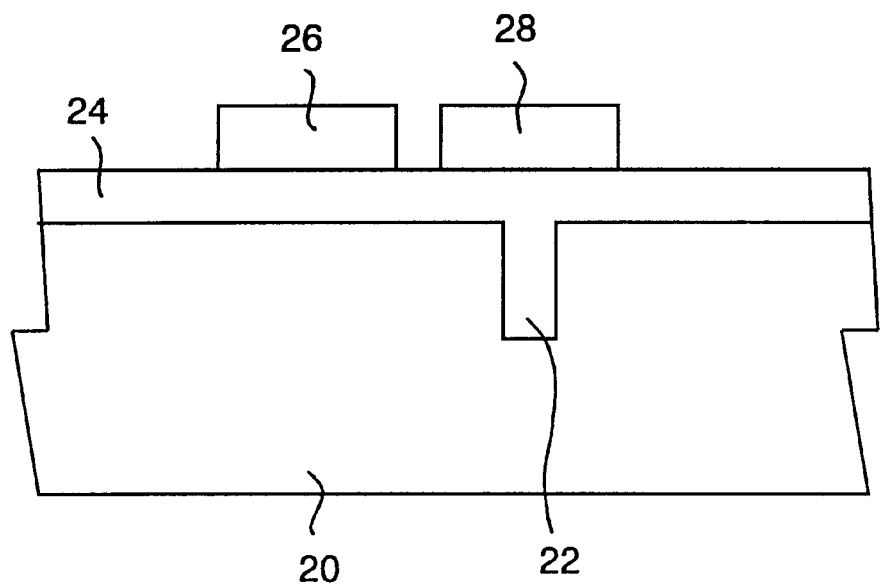
FIG. 4 shows a first cross-sectional structure of the embodiment.

FIG. 4 shows a cross-sectional structure embodying the invention in form of a ridge-type structure. A groove 22 for making the waveguide 14 is previously formed in an InP substrate (cladding layer) 20, and an InGaAsP waveguide layer 24 is grown. Then, an InP cladding layer 26 for regulating the waveguide 12 and an InP cladding layer 28 for regulating the waveguide 14 are respectively stacked in positions on the waveguide layer 24. Practically, after an InP layer to be finally formed into the cladding layers 26, 28 is grown on the waveguide layer 24, selective part of the InP layer other than the portions for the cladding layers 26, 28 may be removed.

Figure 5:
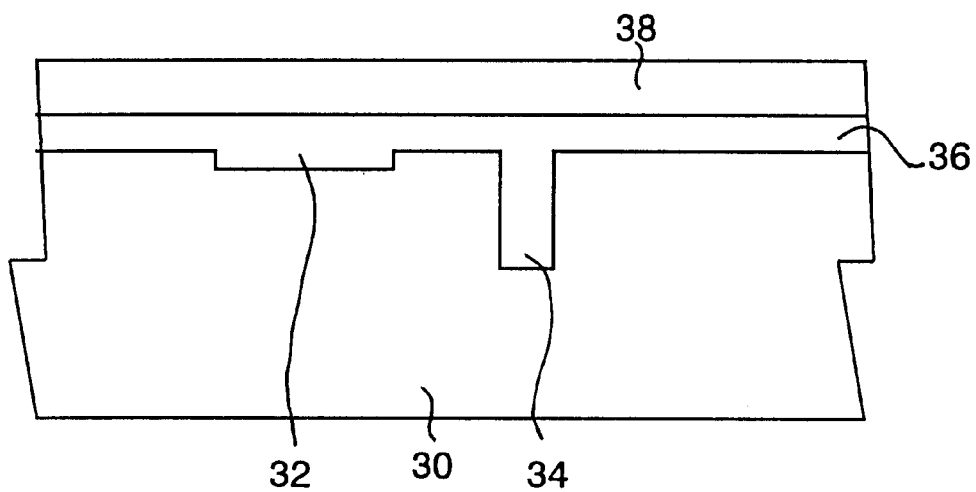
FIG. 5 shows a second cross-sectional structure of the embodiment.

FIG. 5 shows a cross-sectional structure modified from the structure of FIG. 4. Formed in an InP substrate 30 are a groove 32 for making the waveguide 12 and a groove 34 for making the waveguide 14 side by side, taking changes in size during subsequent steps of the manufacturing process into account. After that, an InGaAsP waveguide layer 36 is stacked on the InP substrate 30 to fully fill the grooves 32, 34 and to reach a predetermined thickness, and an InP cladding layer 38 is stacked thereon.

Figure 6:
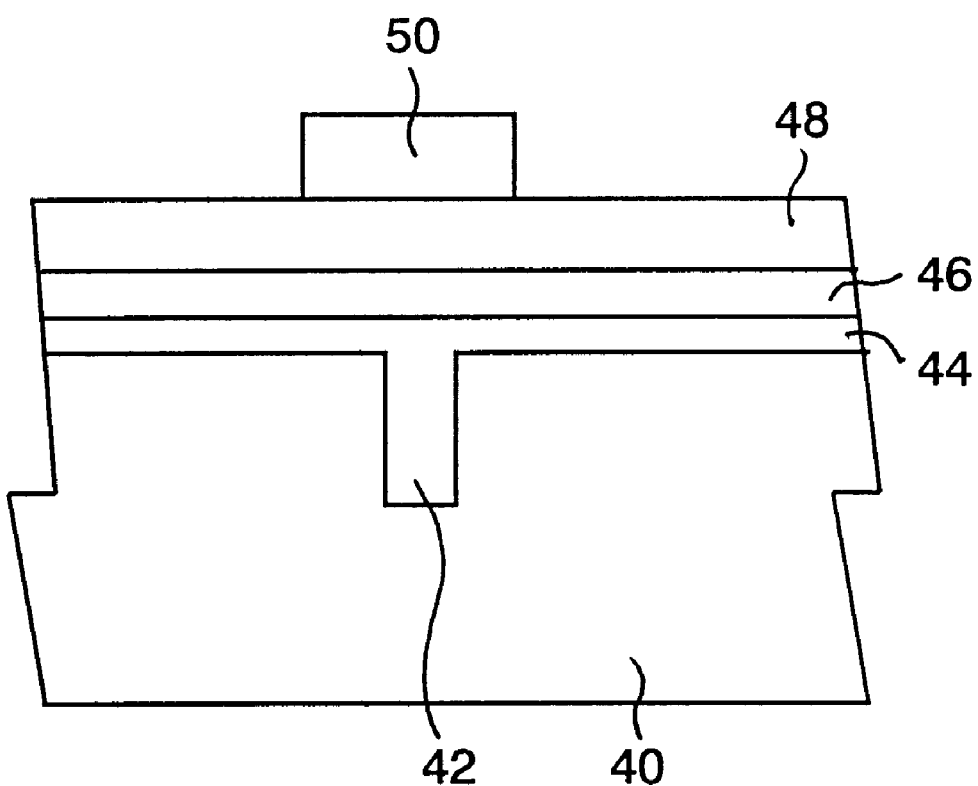
FIG. 6 shows a third cross-sectional structure of the embodiment.

Although the above-explained structures arrange the waveguides 12, 14 in a horizontal alignment, the waveguides 12, 14 may be piled vertically. FIG. 6 shows such a structure. A deep groove 42 for making the waveguide 14 is formed in an InP substrate 40, and an InGaAsP waveguide layer 44 is stacked to fully fill the groove 42 and to reach a predetermined thickness. Then, an InP separation layer 46 is stacked on the waveguide layer 44, and an InGaAsP waveguide layer 48 is stacked thereon. After that, an InP cladding layer 50 for making the waveguide 12 is selectively stacked on the waveguide layer 48.

Injection electrodes may be formed individually on the waveguides 12, 14, and a common electrode may be formed on the substrate so that the waveguides 12, 14 can be supplied with a current independently. Thus, the refractive indices of respective waveguides 12, 14 can be fine-adjusted by controlling the injected current. If a current is supplied to both waveguides 12, 14, then the device functions as a wavelength variable optical filter.

As explained above, the invention can realize a coupled waveguide structure having a very simple construction and having no or less polarization dependency. As a result, the invention can realize a wavelength selection filter, wavelength eliminating filter or add/drop device with no or less polarization dependency.

Furthermore, it will be apparent to those skilled in the art that various changes and modifications can be made to these specific embodiments without departing from the spirit and scope of the invention as defined in the claims.

What is claimed is:

1. A coupled waveguide structure comprising a first waveguide and a second waveguide disposed closely and having aspect ratios, which are different, that are substantially inverse numbers.

2. The coupled waveguide structure according to claim 1 further comprising a diffraction grating common to said first waveguide and said second waveguide for compensating a difference in TE mode propagation constants and a difference in TM mode propagation constants between said first waveguide and said second waveguide.

3. The coupled waveguide structure according to claim 1 further comprising a diffraction grating common to said first waveguide and said second waveguide, the diffraction grating having a wave number substantially equal to both of the sum of TE mode propagation constants and the sum of TM mode propagation constants of said first waveguide and said second waveguide.

4. A coupled waveguide structure comprising a first waveguide and a second waveguide disposed closely in which the sum of TE mode propagation constants of said first waveguide and said second waveguide is substantially equal to the sum of TM mode propagation constants of said first waveguide and said second waveguide.

5. The coupled waveguide structure according to claim 4 further comprising a diffraction grating common to said first waveguide and said second waveguide for compensating a difference in TE mode propagation constants and a difference in TM mode propagation constants between said first waveguide and said second waveguide.

6. The coupled waveguide structure according to claim 4 further comprising a diffraction grating common to said first waveguide and said second waveguide, the diffraction grating having a wave number substantially equal to both of the sum of TE mode propagation constants and the sum of TM mode constants of said first waveguide and said second waveguide.

* * * * *